United States Patent [19]

Murphy et al.

[11] 4,035,555
[45] July 12, 1977

[54] RECHARGEABLE NONAQUEOUS BATTERIES

[75] Inventors: Donald Winslow Murphy, Warren; Forrest Allen Trumbore, Summit, both of N.J.

[73] Assignee: Bell Telephone Laboratories, Incorporated, Murray Hill, N.J.

[21] Appl. No.: 682,837

[22] Filed: May 4, 1976

[51] Int. Cl.² ............................................ H01M 10/36
[52] U.S. Cl. ............................ 429/194; 429/217; 429/218; 429/232
[58] Field of Search ............... 136/6 LN, 6 L, 6 R, 136/20, 83 R, 100 R, 137; 429/194, 199, 217, 218, 232

[56] References Cited
U.S. PATENT DOCUMENTS

| 3,681,144 | 8/1972 | Dey et al. | 136/83 R |
| 3,791,867 | 2/1974 | Broadhead et al. | 136/6 R |
| 3,864,167 | 2/1975 | Broadhead et al. | 136/6 LN |

OTHER PUBLICATIONS

Acta Chemica, 1965, Scandinavica, 19, No. 4, "On Niobium Selenides with Approximate Composition $NbSe_4$," pp. 1002–1024.

Primary Examiner—Anthony Skapars
Attorney, Agent, or Firm—Walter G. Nilsen

[57] ABSTRACT

Nonaqueous, rechargeable batteries are described which employ a conventional negative electrode and a positive electrode with a new and unique active material. Such batteries are advantageous because of the high capacity per unit weight and per unit volume exhibited by the positive electrode and the extensive rechargeability of these batteries.

9 Claims, 3 Drawing Figures

RECHARGEABLE NONAQUEOUS BATTERIES

BACKGROUND OF THE INVENTION

1. Field of the Invention

The invention relates to nonaqueous rechargeable batteries with certain transition-metal chalcogenides as the active material in the positive electrode.

2. Description of the Prior Art

Nonaqueous batteries are of interest commercially because of their high cell voltage and high capacity per unit weight and volume. There are many applications of interest, especially where weight or volume are critical factors. Such situations might be in aircraft, satellites, memories and electronic circuits. Both primary and secondary batteries are now used for such applications.

A particularly difficult problem in nonaqueous batteries is obtaining a rechargeable battery without sacrifice in the desirable capacity per unit weight characteristics. A previously issued patent (U.S. Pat. No. 3,864,167) described remarkable progress towards achieving a rechargeable battery with high capacity per unit weight. However, even greater capacity is desirable for many commercial applications employing rechargeable batteries. Also, an improved discharge characteristic would make nonaqueous batteries more useful. For example, a near constant voltage over large portions of the discharge curve is highly desirable for many applications.

SUMMARY OF THE INVENTION

The invention is a nonaqueous secondary cell in which the positive electrode contains as the active material the compound niobium tetraselenide with nominal formula $NbSe_{4+x}$ in which $x$ may vary from 0 to 0.5. This composition range refers to a single phase of niobium tetraselenide. The negative electrode is conventional and is lithium because of its large negative electromotive force and light weight. The electrolyte is also conventional and may contain various additives to improve recyclability. A typical electrolyte is $LiClO_4$ dissolved in propylene carbonate. Other substances may be added including tetraglyme. Batteries employing the inventive positive electrode exhibit high energy density and are extensively rechargeable under operating conditions. In addition, when cycled at low currents these cells exhibit constant voltage over much of their discharge curve which is highly advantageous for many applications.

Detailed Description

1. Preparation of the Active Material

Figure 1:
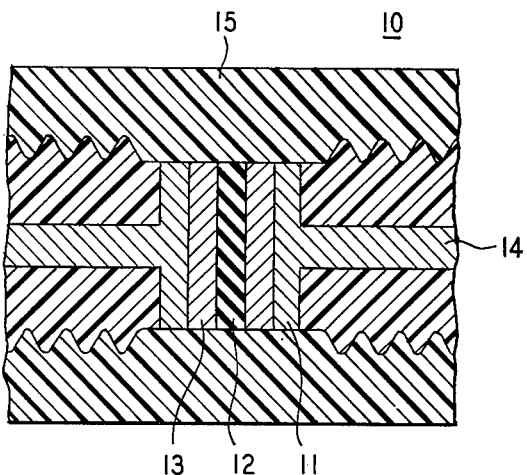
FIG. 1 is a side view in section of a nonaqueous cell employing a positive electrode with niobium tetraselenide as the active material and a conventional negative electrode and conventional nonaqueous electrolyte.

The material may be prepared in a variety of ways. The preparation should be carried out in the absence of air and moisture and done in such a way as to insure the formation of predominantly niobium tetraselenide.

The following example will serve to illustrate the preparation of the niobium tetraselenide. Appropriate amounts of niobium powder and selenium shot are sealed in an evacuated fused quartz ampoule. The ampoule is then heated from 400° to 500° C at a rate of 25° C per day. The ampoule is then held at this higher temperature for approximately two to three days. This procedure leads to the formation of $NbSe_{4.0}$. If $NbSe_{4.5}$ is desired, the mixture niobium and selenium is adjusted in composition to correspond to $NbSe_{4.5}$ and the temperature treatment is carried out to a temperature of 550 degrees C rather than 500° C. The composition and properties of niobium selenide compounds are discussed in several references including "On Niobium Selenides with Approximate Composition $NbSe_4$," Kari Selte and Arne Kjekshus, Kjemisk Institutt A, Universitetet i Oslo, Blindern, Oslo 3, Norway, Acta Chemica Scandinavica 19 (1965) No. 4, pp. 1002–1024; "Intermediate Phases in the Systems Niobium-Selenium, Niobium-Tellurium, Tantalum-Selenium, and Tantalum-Tellurium," K. Selte, E. Jjerkelund and A. Kjekshus, Department of Chemistry A, University of Oslo, Blindern, Norway, Journal of the Less-Common Metals, II (1966) pp. 14-30; "Chimie Minerale," Caracterisation d'un seleniure de niobium de composition $NbSe_{4.5}$ ($Nb_4Se$ ). Mme Louisette Guemas, MM. Alain Meerschaut et Pierre Palvadeau, transmise par M. Georges Champetier, C. R. Acad. Sc. Paris, t. 281, September 1976).

The active material used here is believed to correspond to the gamma phase in the above references. For many applications, essentially pure niobium tetraselenide is preferred. This is particularly true where low discharge rates are satisfactory. Under some circumstances, some niobium triselenide (up to 10 weight percent) is desirable because it increases the conductivity of the electrode with minimum reduction in capacity. The reason for this is the fact that niobium triselenide is highly conductive and also contributes to the capacity of the battery. Heating a mixture of niobium and selenium with composition richer in niobium than $NbSe_{4.0}$ to 550° C for 3 days results in a mixture of $NbSe_3$ in niobium tetraselenide.

2. Preparation of the Cell

All the cells are constructed in the absence of air and moisture, generally in a dry box under an inert atmosphere such as argon gas. The positive electrodes are made of the niobium tetraselenide and may also be mixed with various substances such as graphite and polyethylene to increase conductivity and make the electrode more easily shaped. Where a mixture is used, ball milling is used to obtain a homogeneous mixture. The mixture is usually pressed, generally at an elevated temperature and a nickel screen may be used as a current collector. A mixture of niobium tetraselenide and niobium triselenide is also used to increase electrical conductivity. The negative electrode is conventional and generally made of lithium.

A cell 10 suitable for some applications of the invention is shown in FIG. 1. The cell structure consists of a negative electrode 11, a separator 12, impregnated with a nonaqueous electrolyte and a positive electrode 13 containing niobium tetraselenide as the active material. Current is collected with a plunger 14.

Figure 2:
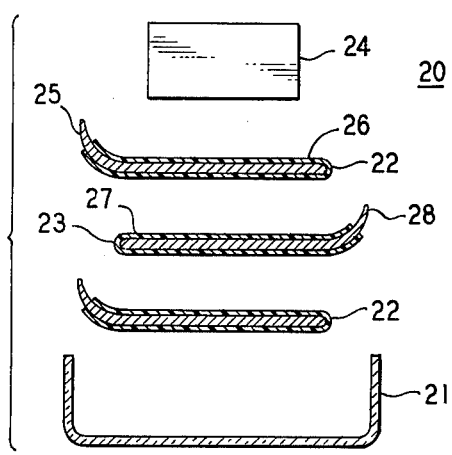
FIG. 2 is an exploded view which shows the components of a horizontal cell with positive electrode employing niobium tetraselenide and negative electrode employing lithium as the active material.

Another type cell, called a horizontal cell 20, is shown in FIG. 2. This cell is contained in a glass dish 21, with lithium 22 and niobium tetraselenide 23 electrodes. The cell is weighted down with a teflon block 24. Each lithium electrode 22 contains lithium metal 25 in a polypropylene bag 26. The niobium selenide electrode 23 is made up of a polypropylene separator bag 27 and an electrode containing the active positive material pressed onto a nickel screen.

3. Examples

The invention is illustrated by a number of examples.

EXAMPLE 1

A mixture of 4.767 grams of selenium shot 5N purity) and 1.403 grams of niobium powder (30 $\mu$m, 99.95% pure) was heated in a sealed vitreous silica ampoule for 3 days at 550° C. The resulting $NbSe_4$ contained fibers of $NbSe_3$, as observed in the scanning electron microscope (SEM), at levels of less than ~5% as shown by the absence of $NbSe_3$ lines in the x-ray powder pattern. A "pocket" (3 cm × 1 cm × 50 mils) was constructed of perforated nickel into which was stuffed 0.314 grams of the $NbSe_4$-$NbSe_3$ mixture. A cell was constructed using this pocket cathode sandwiched between two 15 mil thick lithium anodes, all three electrodes being contained in polypropylene separator bags wetted with tetraglyme. An electrolyte of 1M $LiClO_4$ in propylene carbonate was used. The cell was then cycled between 2.8 and 1.0 volts at a discharge current of 5 milliamperes and a charging current between 3.6 and 5 milliamperes. The initial discharge capacity was 80.5 mA-hours compared with a theoretical capacity of 82 mA-hours assuming 4 lithium atoms per mole of $NbSe_4$. This cell was cycled 28 times with an average depth of 35 mA-hours.

EXAMPLE 2

Niobium selenide in the range $NbSe_{4.0}$ to $NbSe_{4.5}$ was prepared by heating stoichiometric amounts of niobium and selenium in sealed ampoules from 400° C to 500–510° C at a rate of about 25° per day and holding at the higher temperature for 2–3 days. The resulting products were free from any significant $NbSe_3$ contamination as determined from SEM and x-ray observations. A mixture of 150 mesh $NbSe_{4.5}$, prepared in this manner, with 325 mesh graphite powder and polyethylene powder (Microthene 500) in the ratio 65.3: 29.6: 5.1 weight percent, respectively, was rolled in a jar mill for 16 hours. The mixture was then pressed to 6500 psi at 130° C for 3 minutes onto an expanded nickel screen to form a "composite" cathode 3 cm × 3 cm and 25.5 mils thick with a weight of 1.61 grams, exclusive of the nickel screen. A cell was constructed, again by sandwiching the cathode between two Li electrodes, all electrodes in polypropylene separator bags and placing horizontally in a Petri dish-type container with 8 ml of 1M $LiClO_4$ in propylene carbonate (PC). This cell was cycled between 2.8 volts and 1.0 volts with a discharge current of 10 milliamperes and a charge current of 5 milliamperes. The initial discharge capacity was 109.5 mA-hours compared to a theoretical capacity of 252 mA-hours based on 4 Li atoms per mole of $NbSe_{4.5}$.

EXAMPLE 3

A cell was constructed from the same mixture as in Example 2 except that the weight was 1.375 grams exclusive of the nickel screen, and the thickness was 22.5 mil. The corresponding cell, constructed as in Example 2, was cycled at 25% of the theoretical discharge capacity of 215 mA-hours for 4 Li atoms per mole of $NbSe_{4.5}$.

EXAMPLE 4

Using the same mixture as in Example 2, a smaller cathode was constructed (12.8 cm² instead of 18 cm² area (both sides), 18.5 mils thickness) with 0.722 grams. The corresponding cell, prepared as in Example 2, was cycled at 25% of the assumed theoretical discharge capacity of 113 mA-hours at charge and discharge currents equal to 5 milliamperes. The cell was cycled 28 times.

EXAMPLE 5

Using a mixture of 65 weight percent $NbSe_4$ (prepared as described in Example 2), 30% graphite and 5% polyethylene (total weight = 1.548 grams) a 3 cm × 3 cm cathode was prepared as in Example 2. The corresponding cell, prepared as in Example 2, was cycled between 2.8 and 1.0 volts at a discharge current of 10 milliamperes and a charge current of 5 milliamperes. The initial discharge capacity was 93 mA-hours compared to a theoretical capacity of 264 mA-hours based on 4 Li atoms per mole of $NbSe_4$.

EXAMPLE 6

A smaller cathode (4.5 cm², both sides; total weight = 0.327 grams) was prepared using the same mixture as in Example 5. The corresponding cell, constructed as in Example 2, was cycled at charge and discharge currents of 1.5 milliamperes to a depth of 25% of the theoretical capacity of 56 mA-hours based on 4 Li atoms per $NbSe_4$. This cell was cycled 58 times.

4. Cell Performance

Figure 3:
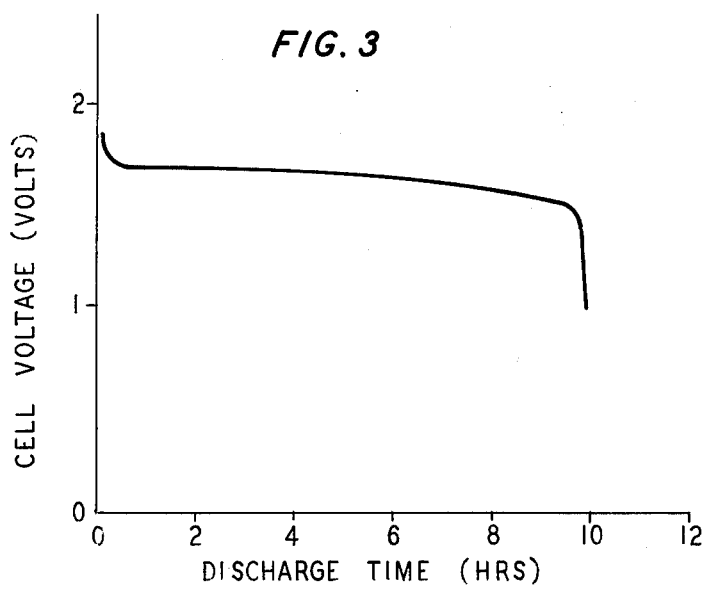
FIG. 3 is a graph which presents data on cell voltage as a function of discharge time.

In addition to the extensive recycling characteristics of these cells, the cell voltage also remains remarkably constant during discharge. This is illustrated in FIG. 3 where cell voltage is plotted against discharge time at a discharge current of 2 milliamperes for a cell with positive electrode containing $NbSe_{4.0}$ with same $NbSe_3$ (less than 5 weight percent). Constant cell voltage during discharge is advantageous in many applications for batteries. The constant voltage characteristic appears more pronounced for $NbSe_{4.0}$ than $NbSe_{4.5}$.

What is claimed is:

1. A nonaqueous secondary battery comprising a negative electrode, an electrolyte and a positive electrode in which the positive electrode contains as active material a substance which consists essentially of at least ninety weight percent niobium tetraselenide.

2. The battery of claim 1 in which the remaining active material is niobium triselenide.

3. The battery of claim 1 in which the negative electrode is a lithium electrode.

4. The battery of claim 1 in which the niobium tetraselenide has nominal formula $NbSe_{4+x}$ in which $x$ ranges from 0 to 0.5.

5. The battery of claim 1 in which the electrolyte is $LiClO_4$ dissolved in propylene carbonate.

6. The battery of claim 5 which contains in addition tetraglyme.

7. The battery of claim 1 in which the positive electrode contains electrolytically inactive material to improve conductivity and cohesiveness.

8. The battery of claim 7 in which the positive electrode contains carbon to increase conductivity.

9. The battery of claim 7 in which the positive electrode contains polyethylene powder to increase cohesiveness.

* * * * *